Patented Sept. 23, 1941

2,256,914

UNITED STATES PATENT OFFICE 2,256,914

CATTLE FOOD AND METHOD OF PREPARING SAME

Herbert H. Whitcomb, Littleton, Mass.

No Drawing. Application April 26, 1938,
Serial No. 204,351

4 Claims. (Cl. 99—2)

This invention relates to a food for cattle and to a method for preparing the same.

Milk has long been recognized as an ideal food because it contains, in proper proportions and in easily assimilated forms, the elements which are essential for normal human growth and development. This is also to a large degree true of milk in skimmed form, because the separation of the cream from the milk removes chiefly the fats and does not materially affect the mineral constituents. Among the various elements found in milk are considerable quantities of calcium and phosphorous in easily assimilated forms, the former of which is necessary for bone structure and the latter of which contributes to the prolific characteristics. Unless these constituents are supplied in proper quantity by grain or special foods, the cattle may be more or less deficient in calcium and phosphorous, due to the lack of sufficient quantities of these elements in the hay or grass upon which they feed.

Unless the pasture where the cattle feed during the pasturage season, or the ground from which the hay is cut, is properly fertilized to renew the calcium and phosphorous taken from the soil by the grass or hay, these substances are gradually exhausted and the grass or hay becomes deficient in both. This lack might cause, in time, a deterioration in the bone structure and the prolific characteristics of the cattle. Although milk as a food is as beneficial for cattle as it is for humans, yet it is a well-known fact that mature cattle will not ordinarily drink milk.

The general object of my invention is the provision of a food for cattle which is cheap, palatable, well balanced, and highly digestible, and which contains all the chemical elements necessary for normal growth and maintenance of the best conditions of health.

A more specific object of the invention is the provision of a food of the character described which contains a large percentage of nutritive products derived from milk in a form which cattle will eat and which is easily assimilable to provide them with adequate quantities of calcium and phosphorous.

Another object is the provision of a method for preparing the food which is simple and can be carried out as a part of the daily routine by any farmer to meet the food requirements of his cattle.

A further object is the provision of a method which permits the food to be canned and kept indefinitely for future use.

Other objects of the invention will be in part obvious and in part specifically described hereinafter.

Briefly, my invention contemplates a cattle food comprising finely cut hay or grass, or a mixture of the two, saturated with milk to which has been added a suitable carbohydrate, such as molasses, and properly salted and then brought into a condition of mild fermentation. The invention further contemplates a method for preparing the food consisting in cutting hay or grass, or a mixture of the two, to a small size, placing it in a suitable container and immersing it in milk flavored with a suitable carbohydrate and salt, then closing the container to make it air tight and permitting the mixture to stand until the hay or grass or mixture has become thoroughly saturated with the milk solution and has reached a condition in which fermentation has been set up.

In preparing the food, hay or grass of any variety such as timothy, clover, blue grass or alfalfa, or a mixture of them, may be used and is first cut or chopped into small pieces approximately one-half inch long. For this purpose, any suitable device may be used such as a hammer mill which also crushes the material which is of advantage. The cut material is then placed in any suitable container capable of being closed to make it relatively air tight.

A milk solution is then prepared by taking a suitable quantity preferably of pasteurized skimmed milk and mixing with it any suitable carbohydrate such as cane molasses in proper proportions. A small amount of salt is then added. I have found that a mixture of seventy parts by weight of the milk to five parts of the carbohydrate and one part of salt is very satisfactory and gives good results, but these proportions may be varied within reasonable limits. These ingredients are thoroughly mixed by stirring or agitation in a suitable container and the solution is preferably heated to a temperature of from 110 degrees to 120 degrees Fahrenheit either during or after the mixing. The warm solution when prepared is poured over the cut hay or grass which is then tamped down to compress it into a compact body. Additional cut material is then placed in the container and tamped down until it is filled and additional solution is added to immerse completely the hay or grass. The solution must be sufficient in amount to cover completely the hay or grass when tamped. The relative proportions of the cut material and the milk solution will vary to some extent dependent upon the amount of moisture present in the hay or grass, but I have found that these proportions, when hay is used, will approximate 25% by weight of the cut material to 75% of the solution. When grass alone is used, the percentage of the solution will be somewhat reduced. These relative proportions are controlled, however, by using an amount of the solution sufficient to cover completely the tamped material.

After this has been done, the container is then closed to exclude air and the mixture is allowed to stand for approximately twenty-four hours, during which time a fermentation takes place and the proper change of the contents has been reached. During this period, thermophilic bacteria in the hay act on the sugars to produce the lactic and amino acids in the solution and under these conditions to further act on the hay or grass to break down cellulose and starches in their internal portions and to bring about the desired degree of fermentation, yielding food acids. There is a temperature rise of about 130° F. before the container is opened, and the silage therein will be found to be comparatively free of unabsorbed liquid and warm, sticky and extremely palatable for live stock. It is then ready for use.

Whole pasteurized milk may be used for the solution, or powdered skimmed or whole milk where the liquid form is not available. When the powdered form is used, it is mixed with water in the proportions of one pound of powder to twelve pounds of water. The mixture, however, must be heated and agitated until the powder is thoroughly dissolved.

The use of skimmed or whole milk in powdered form will be found preferable in localities where the farmer does not produce a surplus of either in liquid form sufficient for the preparation of the food, and it is preferable to buying the whole or skimmed liquid milk from other sources. In the process of reducing milk to the powdered form, all impurities are eliminated, but in the purchase of liquid milk from other sources, the farmer is not assured that it may not be contaminated by impurities.

As hereinbefore described, my method contemplates the preparation of the food for immediate use, but by a slight variation of the method, the prepared food may be canned for future use. It may, in such case, be put up in metallic cans or drums of 100, 200, or 300 pounds capacity, and then immediately sealing the can. The cans may be kept for future use, or they may be shipped for use in other localities.

Although the canning method can be used for food made from hay or grass or a mixture of them, it is of special advantage in the case where fresh grass is the base.

Fresh grass contains a considerable amount of vitamin A and carotene. Vitamin A acts upon and benefits the nervous system. The carotene imparts the yellow color to the cream. When grass is dried into hay, some of the vitamin A and a large proportion of the carotene disappear. When cows are fed in pasture or with green grass, they are in better physical condition and produce milk having the desirable deep yellow color, but when fed on hay, the reduced amount of vitamin A and carotene in the hay tends to lower the physical condition of the cattle and also to lessen the yellow color in the milk. This is especially noted by the difference between what is known as "summer milk" and "winter milk." In the milk produced in the winter, when the cows are fed on hay, the milk is of lower nutritional value from a vitamin standpoint than during the summer months. This lessening is to a marked degree. Fresh grass, in many places, can be obtained only in the summer months, and if the process is applied to this grass at that time, and the food is put up in cans properly sealed, it is then available for use in the winter months to advantage.

In using the food, I have found that the best results appear to be secured by feeding from thirty to forty pounds of the food to each animal daily.

I have found that the use of a cattle food prepared in accordance with my invention has a great many advantages. The general health of the cattle shows a marked improvement in all respects within a relatively short period. The condition of the skin improves and the hair becomes smooth and oily. I have noticed a large increase in the amount of urine, in some cases to the extent of 50% more. The feces show no undigested masses and appears identical with the feces when the cattle are out at pasture, which is the best time of the year. I have determined the general improvement of the cattle in these respects by careful observation during a period of several months' feeding with my prepared food.

I have found from actual experience in using this silage for milch cows that within a period of several weeks after starting the feed, the cost of grain and hay per cow decreased 50%; that the milk production per cow increased from two to four pounds daily; and that the body weight of each cow increased from twenty-five to fifty pounds. When cattle are fed with this food during the gestation period, the calves weigh from eighty to eighty-five pounds at the time of birth, whereas, normally the weight is approximately sixty pounds. Also, during the lactation period, the production of milk is uniformly increased and shows less falling off toward the end of that period than heretofore.

Other advantages are that it can be prepared by the farmer from day to day with very little capital outlay and without the addition of transportation costs or other expenses. It further enables each farmer to control, in a profitable manner, his surplus production of milk, since he can supply his dealer with such fluid milk and cream as he requires and retain for the preparation of this food his surplus milk, either whole or skimmed, which contains proteins, sugars, starches, vitamins and enzymes which are thus utilized for promoting the health, growth and milk production of his cattle.

It is to be understood that the foregoing description with the various proportions and the times and temperatures stated are by way of illustrating my invention and are not intended to limit it, since these details are approximate only and may be varied within certain limits. While I prefer the use of cane molasses as the carbohydrate for the milk solution, it may be that other carbohydrates having the same essential qualities as cane molasses may be used in substitution thereof. My invention is to be construed broadly except where specifically limited in the following claims.

What I claim is:

1. A cattle food comprising finely cut hay or grass saturated with a sufficient amount of milk and a carbohydrate, such as cane molasses, to provide substantial quantities of protein, calcium and phosphorous in the food all in a state of mild fermentation only, with further fermentation prevented, and in which the thermophilic bacteria in the hay or grass have reacted on the sugars to produce lactic and amino acids and to break down the internal portions of said hay or grass.

2. A cattle food comprising finely cut hay or grass saturated with a sufficient amount of milk and a carbohydrate, such as cane molasses, to provide substantial quantities of protein, calcium and phosphorous in the food which cattle food has undergone mild fermentation for a period of approximately twenty-four hours at a temperature of approximately 110 to 120°, and which has thereafter been prevented from further fermentation.

3. The herein described method of preparing a cattle food consisting in mixing in a suitable container finely cut hay or grass in a sufficient amount of a milk solution containing a carbohydrate to provide substantial quantities of protein, calcium and phosphorous in the food, closing the container, permitting said mixture to stand only until the contents have reached a state of mild fermentation whereby the thermophilic bacteria in the hay or grass react on the sugars to produce lactic and amino acid and to break down the internal portions of said hay or grass, and thereafter preventing further fermentation.

4. The herein described method of preparing a cattle food consisting in mixing in a suitable container finely cut hay or grass with a sufficient amount of milk solution containing a carbohydrate to provide substantial quantities of protein, calcium and phosphorous in the food, the solution being heated to a temperature of approximately 110° to 120° F., closing the container, permitting said mixture to stand for a period of only approximately twenty-four hours whereby the thermophilic bacteria in the hay or grass react on the sugars to produce lactic and amino acids and to break down the internal portions of said hay or grass, and thereafter preventing further reaction and breakdown.

HERBERT H. WHITCOMB.